C. D. FREEMAN & R. W. CHEESBROUGH.
SPRING WHEEL.
APPLICATION FILED JUNE 12, 1912.
1,064,896.
Patented June 17, 1913.
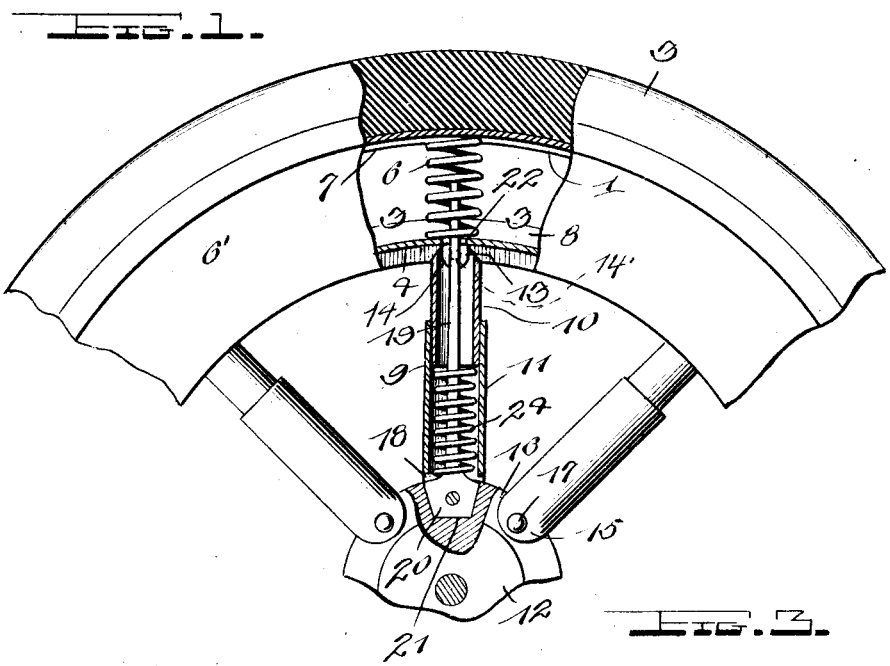
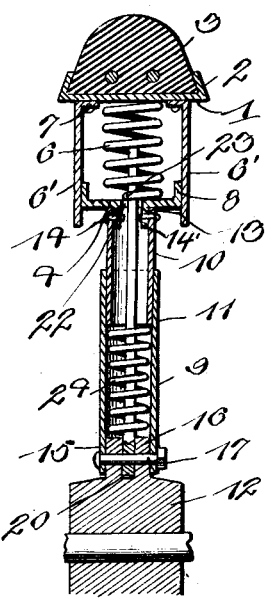
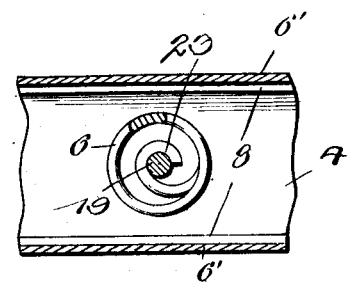
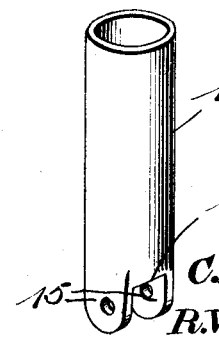
Witnesses
Chas. L. Griestauer.
A. B. Norton.
Inventors
C. D. Freeman
and
R. W. Cheesbrough
By Watson E. Coleman
Attorney

UNITED STATES PATENT OFFICE.

CLIFFORD D. FREEMAN AND RICHARD W. CHEESBROUGH, OF BOGUS, CALIFORNIA.

SPRING-WHEEL.

1,064,896.     Specification of Letters Patent.     Patented June 17, 1913.

Application filed June 12, 1912. Serial No. 703,284.

*To all whom it may concern:*

Be it known that we, CLIFFORD D. FREEMAN and RICHARD W. CHEESBROUGH, citizens of the United States, residing at Bogus, in the county of Siskiyou and State of California, have invented certain new and useful Improvements in Spring-Wheels, of which the following is a specification, reference being had to the accompanying drawings.

This invention comprehends certain new and useful improvements in vehicle wheels and relates more particularly to spring wheels designed for use on automobiles.

The primary object of the invention is to provide a wheel of this type in which there shall be a double cushioning action.

Another object of the invention is to provide a spring wheel that shall be simple in structure, durable, and relatively cheap to manufacture.

The invention also aims to generally improve devices of this nature and to render them more serviceable and commercially desirable.

With these and other objects in view as shall become apparent as the description proceeds the invention consists in certain constructions and arrangement of parts as we shall hereinafter fully describe and claim.

In the embodiment of our invention we provide an outer rim and an inner rim spaced therefrom by a plurality of radially disposed spiral springs, said inner rim being connected to the hub by telescopic spokes.

For a complete understanding of this invention reference is to be had to the following description and accompanying drawing in which—Figure 1 is a side elevation of a portion of our improved spring wheel, partly in section. Fig. 2 is a transverse sectional view. Fig. 3 is a view on the plane of line 3—3 in Fig. 1, and Fig. 4 is a detail perspective view of an inner section of one of the telescopic spokes.

Referring to the drawing by numerals, 1 designates an outer rim provided with the inclined, outwardly projecting annular flanges 2, which serve as clenchers to hold the tire 3 in position. 4 is an inner rim spaced from the outer rim 1 by a plurality of radially disposed spiral springs 6. Spaced guide plates 6' each having an annular flange 7 are secured to the inner face of rim 1 on opposite edges thereof and extend inwardly overlapping the edges of the inner rim 4. Outwardly projecting annular flanges 8 are formed on the edges of the rim 4 and present a broad bearing surface to the plate 6' so that said plates will effectually prevent lateral movement of one rim relative to the other. The flanges 8 also form a channel to receive the inner ends of the springs 6 and hold them against lateral movement. The flanges 7 serve in the same manner to limit the movement of the outer ends of the springs which are secured to the rim 1.

Telescopic tubular spokes 9 each having an outer section 10 fitting within an inner section 11, connect the inner rim 4 to the hub 12. These spokes are arranged in radial alinement with the springs 6. Each section 10 is provided adjacent its outer end with the diametrically opposed, longitudinally extending, apertured projections 13 which are pivotally connected by means of the fastener 14' to the lugs 14 formed integral with the inner face of the rim 4. Spaced parallel ears 15 are formed on the inner end of each of the spoke sections 11 by recessing said sections on opposite sides and flattening the portions between the recesses. These ears 15 fit over the reduced portion 16 of the hub 12 and are pivotally connected thereto by the bolts 17. The edges 18 are spaced from the periphery of the hub 12 so that the spokes may swing freely.

Supplemental or guide spokes 19 are arranged concentrically within the telescopic spokes 9 and have enlarged inner ends 20 which are seated within recesses 21 in the periphery of the hub 12. The ends 20 being tapered to fit snugly within the recesses 21 and are firmly secured in position by the bolts 17 which secure the ears 15. The outer portions of the guide spokes 19 project through longitudinal slots 22 in the rim 4 and have their ends spaced from the rim 1. A spiral spring 6 encircles each spoke 19 and has its inner end 23 bent about the spoke to form an eye as shown in Fig. 3.

Spiral springs 24 positioned with the tubular sections 11 encircle the guide spokes 19 and by bearing against the periphery of the hub 12 and the inner ends of the sections 10 serve to normally retain the said hub concentrically within the rim 4. These inner springs 24 are made somewhat stronger than the outer springs 6 for a purpose to be explained later.

It will be noted that the supplemental or guide spokes perform a number of valuable functions. They limit the torsional movement of the inner rim in relation to the hub, to a degree dependent upon the length of the slots 22. They provide means, independent of the rim 4, for easily securing the inner ends of the springs 6 against circumferential movement which is advantageous since a torsional movement of one rim does not then affect the other. They also prevent lateral movement of the inner rim 4 in relation to the hub 12 and they further act as stops to prevent an undue compression of the spiral springs 6 and 24.

The operation of our improved wheel is as follows: When an average load is placed upon the wheel it is supported by the springs 6 and the stronger springs 24 are not appreciably compressed. Slight variations of pressure due to uneven roads, change in load, etc., affects only the outer springs to any great degree. This is decidedly advantageous since it relieves the telescopic spokes 9 of much frictional wear. If, however, the load is a heavy one it affects both the inner and outer springs causing a sliding movement among the telescopic spokes 9. A load as heavy as to injure the springs forces the outer rim 1 against the ends of the rigid spokes 19 and is then supported by said rigid spokes.

From the foregoing description in connection with the accompanying drawing it will be apparent that we have provided a spring wheel having a double cushioning action and one which can be cheaply manufactured.

While we have shown a preferred form of our invention it is to be understood that minor changes in construction and arrangement of parts may be made without departing from the scope of the invention as defined by the appended claims.

What we claim is:—

1. A spring wheel comprising an outer rim, an inner rim, a plurality of spiral springs radially disposed between said inner and outer rims, a hub, a plurality of telescopic tubular spokes pivotally secured to the inner rim and to the hub, a plurality of spiral springs placed within said tubular spokes and tending to normally hold the hub concentrically within the inner rim, and a plurality of supplemental spokes rigidly secured at their inner ends to the hub and projecting through the tubular spokes and the inner rim.

2. In a spring wheel, the combination of an outer rim, an inner rim, a plurality of spiral springs disposed in radial alinement between the inner and outer rims, a hub, a plurality of telescopic spokes pivotally connected to the inner rim and to the hub, said telescopic spokes comprising outer tubular sections and inner tubular sections, a spiral spring positioned within each inner tubular section and bearing against the periphery of the hub and the inner end of the outer tubular section, a plurality of radially disposed supplemental spokes rigidly connected at their inner ends to the hub, each supplemental spoke projecting through a telescopic spoke and a longitudinal slot formed in the inner rim, said supplemental spokes preventing lateral movement of the inner rim relative to the hub.

3. A spring wheel comprising an outer rim, an inner rim, a plurality of radially disposed spiral springs positioned between the inner and outer rims, a hub, a plurality of radially disposed tubular telescopic spokes comprising outer sections pivotally secured to the inner rim and inner sections overlapping said outer sections and pivotally connected to the hub, a spiral spring positioned within each inner tubular section and bearing against the periphery of the hub and the inner end of the corresponding outer section, and a plurality of supplemental spokes rigidly secured at their inner ends to the hub, each supplemental spoke projecting through a telescopic spoke and through a longitudinal slot formed in the inner rim, said tubular spokes preventing undue rotational movement of the rims relative to the hub and also preventing lateral movement of the rims relative to the hub, the inner ends of the first mentioned spiral springs being held in position by the said supplemental spokes.

In testimony whereof we hereunto affix our signatures in the presence of two witnesses.

CLIFFORD D. FREEMAN.
RICHARD W. CHEESBROUGH.

Witnesses:
 GEO. E. CROW,
 J. H. FOSTER.